United States Patent [19]

Nguyen

[11] Patent Number: 6,067,237
[45] Date of Patent: May 23, 2000

[54] REVERSIBLE DIRECT CURRENT POWER CONVERTER DEVICE CAPABLE OF PROVIDING OUTPUT VOLTAGES GREATER THAN THE FLOATING VOLTAGE OF THE SECONDARY WINDING OF THE TRANSFORMER

[75] Inventor: Uyen Thuy Nguyen, Villefontaine, France

[73] Assignee: Gec Alsthom Transport SA, Paris, France

[21] Appl. No.: 09/137,142

[22] Filed: Aug. 20, 1998

[30] Foreign Application Priority Data

Aug. 21, 1997 [FR] France ................................. 97 10538

[51] Int. Cl.[7] .......................... H02M 3/335; H02M 1/12; H02M 7/68; H02M 7/5387
[52] U.S. Cl. ............................... 363/17; 363/26; 363/41; 363/98; 363/132
[58] Field of Search .................................. 363/17, 24, 25, 363/26, 40, 41, 95, 97, 98, 131–134

[56] References Cited

U.S. PATENT DOCUMENTS

| 3,579,078 | 5/1971 | Cronin | 363/17 |
| 4,354,223 | 10/1982 | Turnbull | 363/124 |
| 4,716,514 | 12/1987 | Patel | 363/127 |
| 5,255,174 | 10/1993 | Murugan | 365/17 |
| 5,513,718 | 5/1996 | Suzuki et al. | 180/65.2 |

OTHER PUBLICATIONS

M. H. Kheraluwala, "Performance Characterization of a High–Power Dual Active Bridge DC–to–DC Converter" IEEE Transactions on Industry Applications, vol. 28, No. 6, Nov. 1, 1992, pp. 1294–1301.

*Primary Examiner*—Peter S. Wong
*Assistant Examiner*—Bao Q. Vu
*Attorney, Agent, or Firm*—Sughrue, Mion, Zinn Macpeak & Seas, PLLC

[57] ABSTRACT

A direct current to direct current power converter device includes a transformer having a primary winding and at least one secondary winding. A first inverter is connected to the terminals of the primary winding of the transformer. At least one second inverter is connected to the terminals of the secondary winding of the transformer or of each secondary winding of the transformer. The first inverter or the at least one second inverter assures the inverter function when a voltage to be converted is applied to its terminals and the rectifier function when the voltage to be converted is applied to the at least one second inverter or to the first inverter.

5 Claims, 3 Drawing Sheets

REVERSIBLE DIRECT CURRENT POWER CONVERTER DEVICE CAPABLE OF PROVIDING OUTPUT VOLTAGES GREATER THAN THE FLOATING VOLTAGE OF THE SECONDARY WINDING OF THE TRANSFORMER

BACKGROUND OF THE INVENTION

1. Field of the Invention

The present invention concerns direct current converters and more particularly converters for use in electrically propelled vehicles such as trolleybuses.

2. Description of the Prior Art

In the field of solid-state power conversion, devices for converting direct current power to alternating current power based on single-phase, three-phase or multi-phase (with a number of phases other than three) converters are known in themselves.

Also known in themselves are devices for converting alternating current power into direct current power using single-phase, three-phase or multi-phase rectifiers.

Also known in itself is a device for converting direct current power into direct current power, with galvanic isolation, using single-phase, three-phase or multi-phase inverter-rectifiers combining the previous two structures with a transformer between the inverter system of the direct current to alternating current converter device and the rectifier system of the alternating current to direct current converter device.

This type of converter has the drawback of being unidirectional, transferring energy in one direction only.

Another drawback of a device of the above kind is that the rectified output voltage cannot under any circumstances exceed the floating voltage of the transformer secondary.

The invention aims to remedy the drawbacks of the prior art devices by creating a direct current to direct current converter device with galvanic isolation which is of relatively simple construction, reversible and can provide rectified output voltages greater than the floating voltage of the secondary winding of the transformer.

SUMMARY OF THE INVENTION

It therefore consists in a direct current to direct current energy converter device including a transformer having a primary winding and at least one secondary winding, a first inverter connected to the terminals of the primary winding of the transformer and a second inverter connected to the terminals of the secondary winding or each secondary winding of the transformer, said first inverter or said at least one second inverter assuring the inverter function when a voltage to be converted is applied to its inputs and the rectifier function when the voltage to be converted is applied to said at least one second inverter or to said first inverter.

In accordance with other features of the invention the converter device forms a voltage step-up device in which said at least one inverter assuring the rectifier function includes in each of its branches a switch commanded cyclically and cooperating with a energy storage inductor during successive conduction of each switch and with a capacitor for storing the energy stored in the corresponding inductor as soon conduction of said switches ceases, each switch is controlled at the same frequency as said at least one inverter which receives the voltage to be converted.

said energy storage inductor during successive conduction in each branch of the corresponding inverter is the leakage inductance of the transformer.

The invention will be better understood from the following description given by way of example only and with reference to the accompanying drawings.

DETAILED DESCRIPTION OF THE PREFERRED EMBODIMENTS

Figure 1:
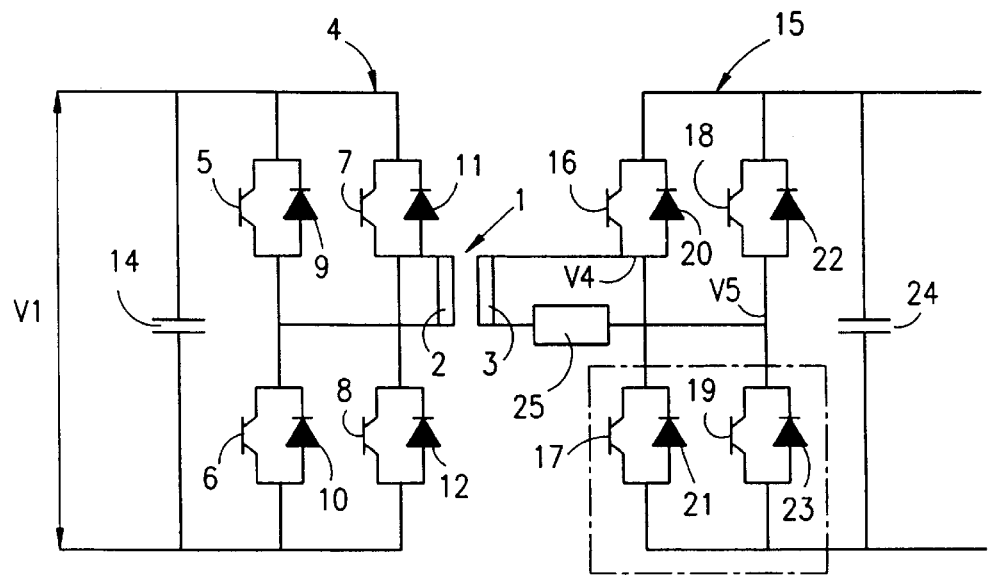
FIG. 1 is a schematic view of a single-phase DC-DC voltage converter device of the invention.

The direct current to direct current power converter device shown in FIG. 1 includes a transformer 1 having a primary winding 2 and a secondary winding 3.

The primary winding is connected to a first inverter 4 consisting of a transistor bridge 5, 6, 7, 8 to the emitter-collector paths of which are connected respective diodes 9, 10, 11 and 12. The primary winding 2 of the transformer 1 is connected between the common points of transistors 5 and 6, on the one hand, and transistors 7 and 8, on the other hand.

The common points of the transistors 5 and 7, on the one hand, and transistors 6 and 8, on the other hand, constitute the terminals of the inverter. A capacitor 14 the function of which is indicated below is connected to these terminals.

The transistors 5, 6, 7, 8 are advantageously insulated gate bipolar transistors (IGBT). Instead of the transistors 5 through 8 any type of solid-state semiconductor switch can be used, for example GTO, MOSFET, etc. The secondary winding 3 of the transformer 1 is connected to a second inverter 15 including a transistor bridge 16, 17, 18, 19. Corresponding diodes 20 through 23 are connected in parallel with the emitter-collector path of each of the transistors 16 through 19.

The secondary winding 3 of the transformer 1 is connected between the common points of transistors 16 and 17, on the one hand, and transistors 18 and 19, on the other hand.

The points common to transistors 16 and 18, on the one hand, and transistors 17 and 19, on the other hand, constitute the terminals of the second inverter 15.

A capacitor 24 is connected to these terminals.

The transistors 16 through 19 are advantageously IGBT.

An inductor 25 is connected in series with the secondary winding 3. The inductor can be a separate inductor or the leakage inductance of the transformer 1. It can also be the combination of the leakage inductance of the transformer associated with an additional separate inductor in order to obtain an inductance value suited to the intended application.

When the device is operating as a normal direct current to direct current converter, the primary winding 2 of the transformer 1 is energized by the first inverter 4 which receives a direct current voltage V1 to be converted at its input.

The secondary winding 3 of the transformer 1 energizes the diode bridge 20 through 23 of the second inverter 15 which therefore assures the rectifier function.

Varying the duty cycle α of operation of the first inverter 4 varies the output voltage of the diode bridge 20 through 23 of the second inverter 15.

In this mode of operation the capacitor 24 simply acts as a filter.

The output voltage is less than or equal to K times the voltage applied to the input of the first inverter 4.

K is the transformer ratio of the transformer 1.

Of course, if the voltage to be converted is applied to the input of the second converter 15, it is the diode bridge 9 through 12 of the first inverter 4 which assure the rectifier function in the manner previously described.

To obtain the voltage step-up effect, two of the transistors 17 and 19 of the second inverter 15 are commanded to operate cyclically with a duty cycle β with the same frequency as that of the first inverter 4, β being less than the duty cycle α of the first inverter 4.

When the secondary voltage wave is respectively positive or negative, the transistor 17 or 19 is turned on, alternate conduction in these two transistors storing energy in the inductor 25.

When the aforementioned transistors are turned off the energy stored in the inductor 25 is transferred into the output capacitor 24 via the diode 20.

Varying the duty cycle β varies the voltage step-up effect to adjust the output voltage across the capacitor 24.

The voltage step-up to obtain output voltages higher than the floating voltage delivered by the secondary winding of the transformer is explained as follows. Let V4 and V5 denote the voltages at the terminals of the secondary winding 3 of the transformer.

When the voltage V4–V5 is positive, i.e. when V4 is greater than V5, the transistor 17 is turned on briefly, which stores energy in the inductor 25.

The transistor 17 is then turned off, which discharges the energy stored in the inductor 25 into the output capacitor 24. This exchange of energy is reflected in an overvoltage U=U(transfo)+LDI/DT.

If the voltage V4–V5 is negative, i.e. when V5 is greater than V4, the transistor 19 is triggered in the manner previously described.

The overvoltage is adjusted by increasing or decreasing the time for which the switching transistors 17 and 19 conduct. The adjustment depends on the chosen value of the inductor 25.

In the example just described the switching transistors 17 and 19 are commanded at the same frequency as the first inverter 4. They can be commanded at a frequency different to that of the first inverter in order to control the waveform of the current in the transformer.

The circuit that has just been described can also operate in voltage step-up mode in the other direction in which case the transistors 6 and 8 of the first inverter 4 operating as a rectifier are command cyclically in the same manner as the transistors 17 and 19.

The converter device described with reference to FIG. 1 is of the single-phase type.

Figure 2:
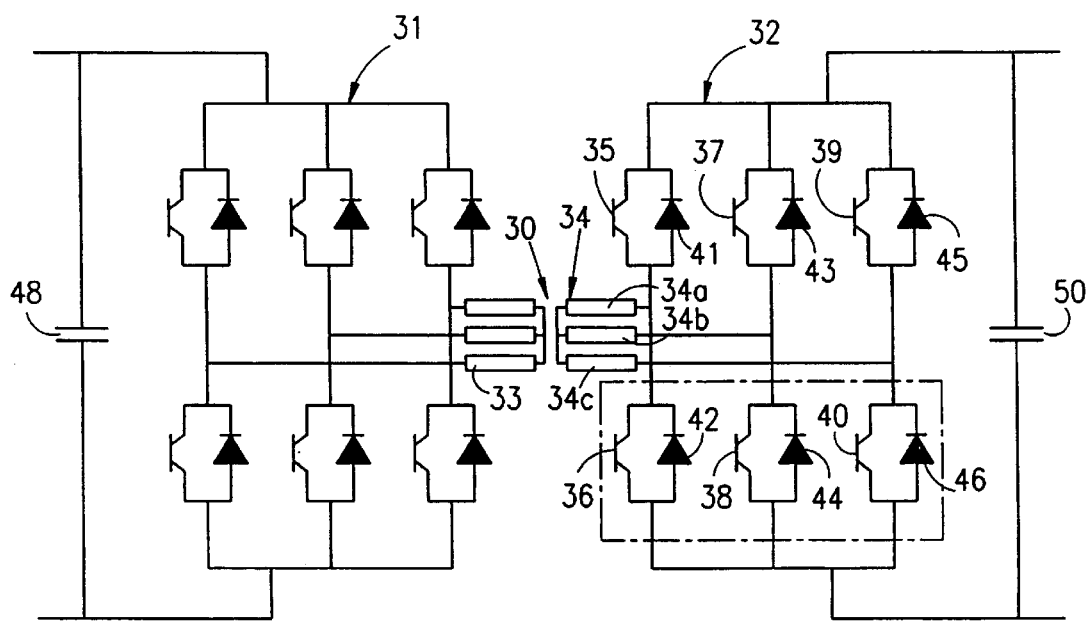
FIG. 2 is a schematic view of a three-phase DC-DC voltage converter device.

Of course, the invention applies equally to a three-phase reversible DC—DC voltage converter. A circuit of this kind is shown in FIG. 2. This circuit is in all regards similar to that from FIG. 1 except that it includes a three-phase transformer 30 and three-phase inverters 31 and 32 respectively connected to the primary winding 33 and the secondary winding 34 of the transformer 30.

The inverter 32 has three branches each comprising two transistors 35, 36, 37, 38, 39, 40 the emitter-collector paths of which are shunted by diodes 41, 42, 43, 44, 45, 46. The inverter 31 is identical.

The secondary windings 34a through 34c of the three-phase transformer are respectively connected directly to the common points of transistors 35, 36, transistors 37, 38 and transistors 39, 40. Their leakage inductances then constitute their energy storage inductances during operation of the device in voltage step-up mode. Separate inductances can also be connected in series between the aforementioned secondary windings and the common points of the associated transistors.

As in the FIG. 1 embodiment, capacitors 48, 50 are respectively connected to the terminals of the three branches of the inverters 31 and 32.

The operation of the FIG. 2 circuit is similar for each phase of operation of the single-phase converter device described with reference to FIG. 1.

When the device is operating in voltage step-up mode, momentary conduction of a transistor 36, 38, 40 of each branch of the inverter 32 which assures the rectifier function is commanded and after each transistor is turned off, the energy stored in the corresponding leakage inductance of the transformer 30 is transferred to the capacitor 36 via the diodes 41, 43, 45.

Of course, operation is similar if it is the inverter 31 which operates as a rectifier.

The reversibility of the circuits just described is obvious given the symmetry of the circuits described with reference to the drawings.

Figure 3:
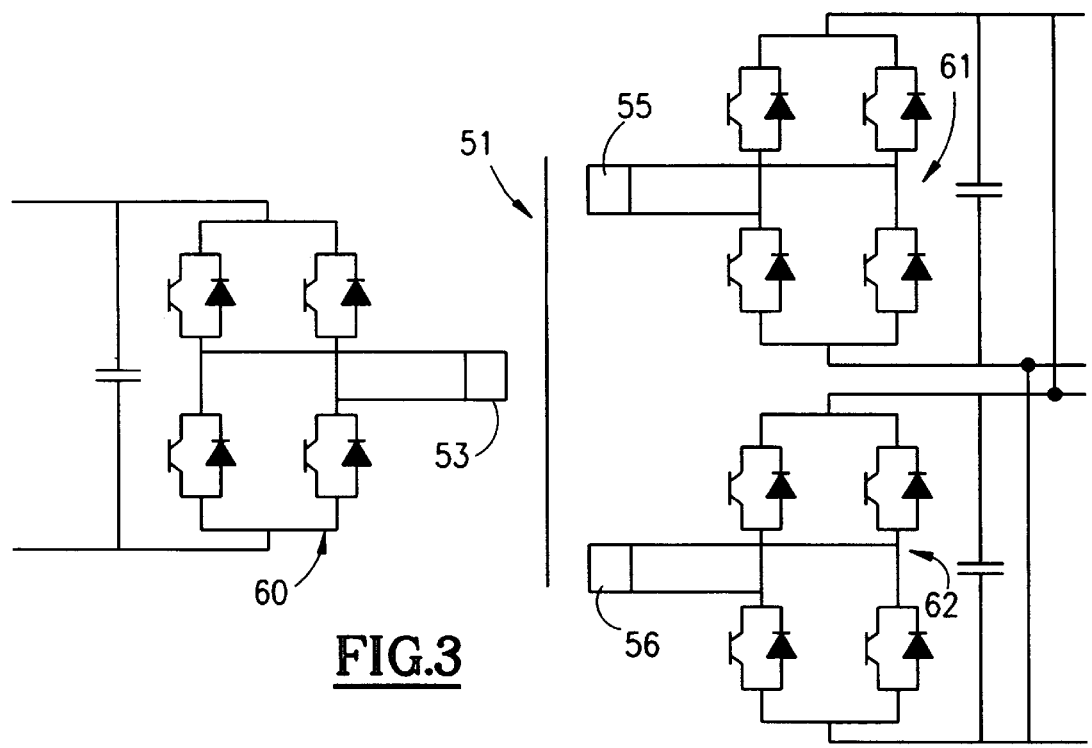
FIGS. 3 and 4 are schematic views of single-phase and three-phase converter devices using a transformer with two secondary windings.
Figure 4:
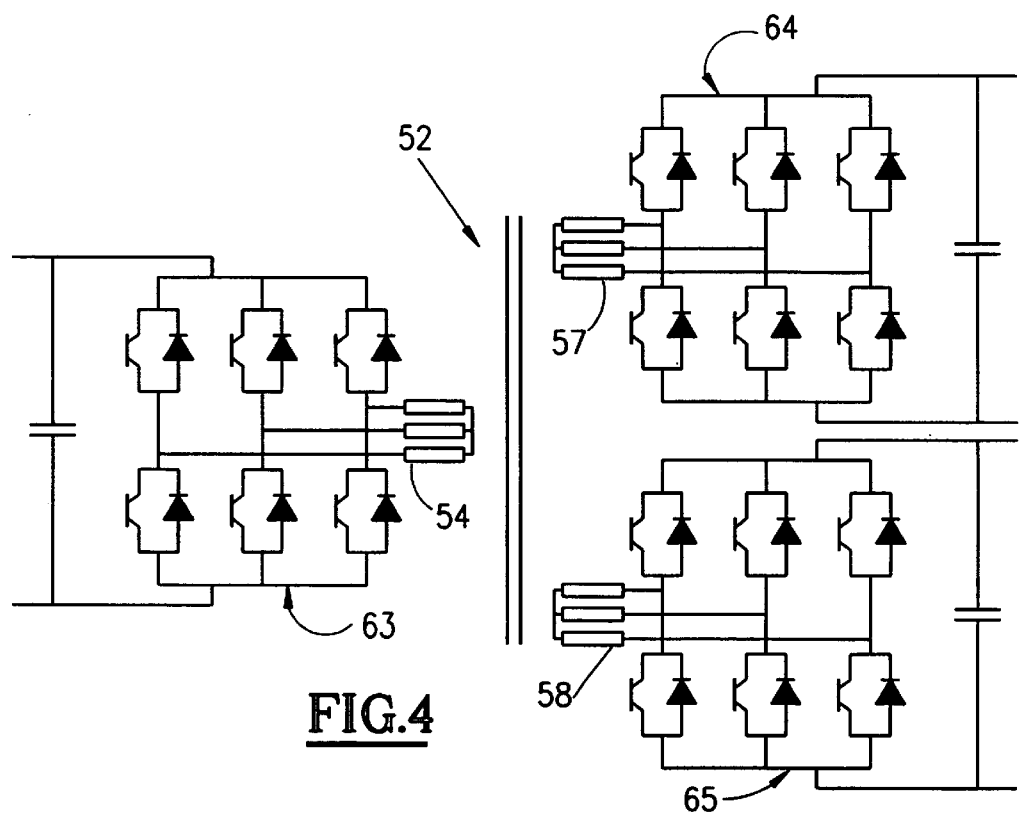

As shown in FIGS. 3 and 4, the invention applies equally to a single-phase or three-phase converter device based on a transformer 51, 52 with a primary winding 53, 54 and at least two secondary windings 55, 56, 57, 58. Inverters 60, 61, 62, 63, 64, 65 similar to those to described with reference to FIGS. 1 and 2 are associated with each winding of the transformer, whether single-phase or three-phase. An arrangement of this kind is particularly beneficial for supplying a plurality of electrical traction motors of a vehicle.

Figure 5:
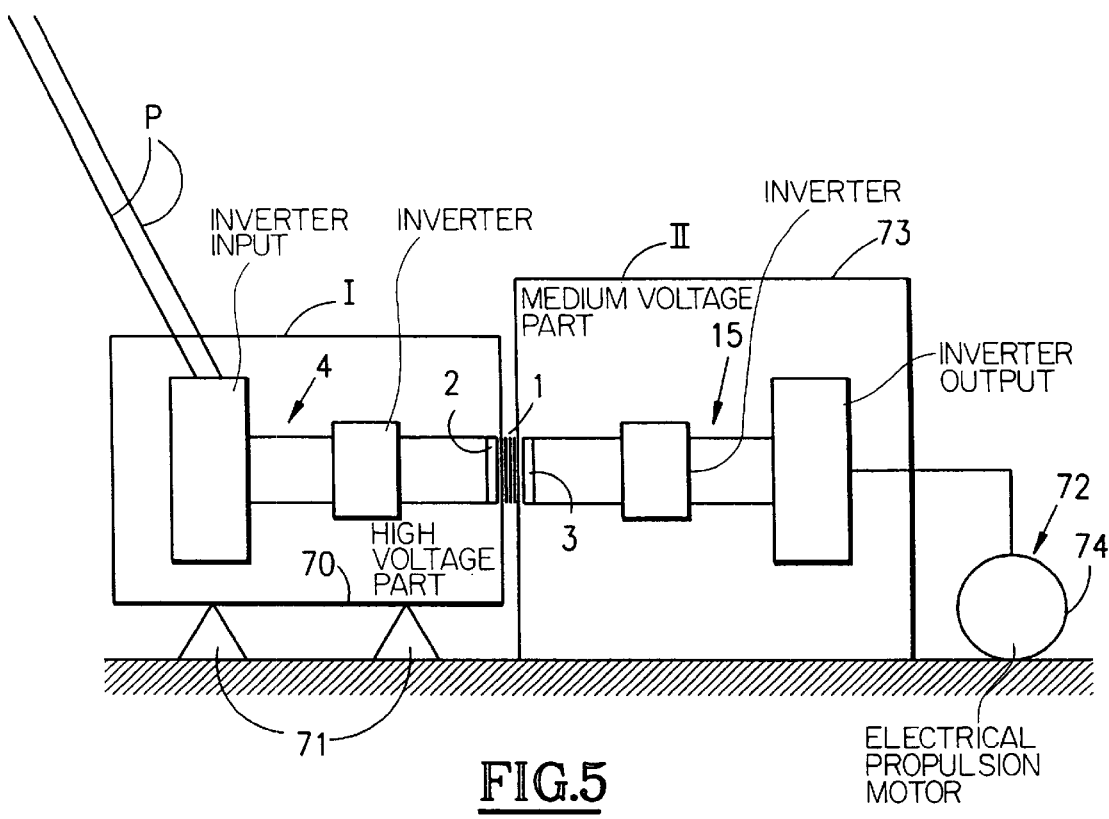
FIG. 5 is a schematic view of the application of the voltage converter device of the invention to an electrically propelled vehicle.

FIG. 5 shows schematically the energy converter device of the invention applied to an electrically propelled vehicle such as a trolleybus.

In conventional trolleybuses the high-voltage equipment of the converter device is insulated by a first or intermediate box which is in turn insulated from the general ground circuit of the vehicle so that the high-voltage equipment is double-insulated from the general ground circuit.

The propulsion motor is also insulated from the general ground circuit of the vehicle. An arrangement of this kind imposes bulky, heavy and costly mechanical solutions.

The converter device of the invention provides good insulation with a lighter structure.

As shown in FIG. 5, the converter device has a high-voltage part I necessitating double-insulation and a medium voltage part II requiring only single-insulation.

Assume by way of example that the converter device used in the FIG. 5 vehicle is similar to that from FIG. 1.

It will nevertheless be understood that the other converter devices described above can equally be fitted to a vehicle of this kind.

The high-voltage part I includes the primary winding 2 of the transformer 1 and the associated inverter 4 the input of which is connected to the current collector rods P of the vehicle.

This part is contained in a first box 70 insulated from the general ground circuit of the vehicle by insulative material studs 71.

The medium voltage part II comprises the secondary winding 3 of the transformer 1 and the associated inverter 15 the output of which is connected to an electric propulsion motor 72.

The part II that does necessitate double-insulation is contained in second box 73 connected to the general ground circuit of the vehicle.

Similarly, the casing 74 of the electrical propulsion motor representing the propulsion subsystem is connected to the general ground circuit of the vehicle.

This avoids the need for double-insulation of the entire system.

Only the high-voltage stage that converts the high-voltage energy into medium-voltage energy feeding the propulsion subsystem is double-insulated.

The propulsion equipment requires only single-insulation.

There is claimed:

1. An electrically propelled vehicle including a direct current to direct current energy converter device for energizing its propulsion subsystem, the converter device comprising:

a transformer having a primary winding and at least one secondary winding;

a first inverter connected to the terminals of the primary winding of the transformer; and at least one second inverter connected to the terminals of the secondary winding or each secondary winding of the transformer, said first inverter or said at least one second inverter assuring the inverter function when a voltage to be converted is applied to its inputs, and the rectifier function when the voltage to be converted is applied to said at least one second inverter or to said first inverter, wherein said device forms a voltage step-up device in which said at least one inverter assuring the rectifier function includes in each of its branches a switch commanded cyclically and cooperating with an energy storage inductor during successive conduction of each switch and with a capacitor for storing the energy stored in the corresponding inductor as soon as conduction of said switches ceases, the converter device further comprising a high-voltage part contained in a first box insulated from the general ground circuit of the vehicle by insulative material studs and a medium-voltage part contained in a second box connected to the general ground circuit of the vehicle.

2. The electrically propelled vehicle as claimed in claim 1 wherein said each switch is controlled cyclically at the same frequency as said at least one inverter which receives the voltage to be converted.

3. The electrically propelled vehicle as claimed in claim 1 wherein said energy storage inductor is the leakage inductance of the transformer.

4. The electrically propelled vehicle as claimed in claim 1 wherein said energy storage inductor is a separate inductor.

5. The electrically propelled vehicle as claimed in claim 1 wherein said inductor is formed by the combination of the leakage inductance of the transformer associated with an additional separate inductor.

* * * * *